United States Patent [19]
Yokouchi et al.

[11] Patent Number: 5,124,060
[45] Date of Patent: Jun. 23, 1992

[54] MAGNETIC FLUID COMPOSITION

[75] Inventors: Atsushi Yokouchi, Yokohama; Toshikazu Yabe, Kanagawa, both of Japan

[73] Assignee: Nippon Seiko Kabushiki Kaisha, Tokyo, Japan

[21] Appl. No.: 602,701

[22] Filed: Oct. 24, 1990

[30] Foreign Application Priority Data

Oct. 25, 1989 [JP] Japan .................. 1-277993

[51] Int. Cl.$^5$ .............................................. C09D 5/23
[52] U.S. Cl. ..................................................... 252/62.51
[58] Field of Search ................. 252/62.51 R, 62.54, 252/309, 315.2

[56] References Cited

U.S. PATENT DOCUMENTS

| | | | |
|---|---|---|---|
| 3,784,471 | 1/1974 | Kaiser | 252/21 |
| 3,917,538 | 11/1975 | Rosenzweig | 252/62.51 |
| 4,405,684 | 9/1983 | Blumentritt | 428/418 |
| 4,624,797 | 11/1986 | Wakayama | 252/62.52 |
| 4,938,886 | 7/1990 | Lindsten | 252/62.51 |

FOREIGN PATENT DOCUMENTS 52-00783 1/1977 Japan .
61-263202 11/1986 Japan .

Primary Examiner—Prince Willis, Jr.
Assistant Examiner—Thomas Steinberg
Attorney, Agent, or Firm—Basile and Hanlon

[57] ABSTRACT

A magnetic fluid composition comprising a less volatile organic solvent as a dispersing medium, a dispersing agent having oleophilic groups exhibiting an affinity therewith, fine ferromagnetic particles coated at the surface thereof with the dispersing agent and dispersed in the less volatile organic solvent and a fluorocarbon surface active material having an organophobic portion and an organophilic portion together in a unitary molecular structure. The magnetic fluid is prepared by the steps of adding the low boiling organic solvent and the dispersant having oleophilic groups to fine ferromagnetic particles to obtain an intermediate medium, separating the fine particles of poor dispersibility from the intermediate medium and, then adding the less volatile organic solvent and heating the resulting material to evaporate the low boiling organic solvent thereby obtaining a magnetic fluid and, further, adding the fluorocarbon surface active material to the magnetic fluid. The magnetic fluid composition can be used for sealing devices in computer hard disk driver or vacuum apparatus.

10 Claims, 4 Drawing Sheets

MAGNETIC FLUID COMPOSITION

BACKGROUND OF THE INVENTION

1. Field of the Invention

The present invention pertains to a magnetic fluid composition which can be used in shaft sealing applications, in particular, for vacuum apparatus, hard disk drive devices for computers, etc. which require high standards of cleanliness, a process for making the same and a magnetic fluid sealing device produced therewith.

2. Description of the Prior Art

In a computer hard disk, the hard disk which functions as a magnetic recording device is disposed in a casing and is rotationally driven by a motor located outside of the casing. Since the hard disk should be strictly kept from contamination caused by dusts or the like, a sealing means is disposed at the region in which the driving shaft of the motor passes through the wall surface of the casing to inhibit the intrusion of the dusts.

Figure 6:
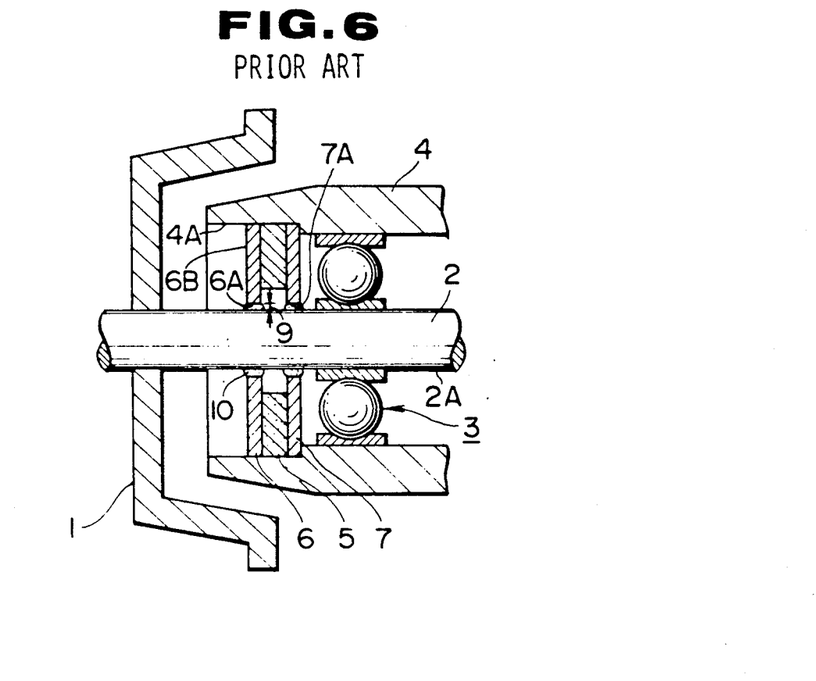
FIGS. 6 and 7 are, respectively, cross sectional views each illustrating a portion of conventional magnetic fluid sealing devices.

Various remedies have been proposed to eliminate this problem. For purposes of discussion, they can be grouped in three classifications or examples. In the first Example, it is known to employ magnetic fluid seal as a sealing means for hard disk drives, as shown in FIG. 6. In this prior art application, a shaft bearing 3 for supporting a drive shaft 2 for a hard disk carrying flange 1 is fitted to a housing 4. Two pole pieces 6 and 7 having a permanent magnet 5 located therebetween are secured to the inner circumferential surface of the housing 4 made of a nonmagnetic material such as aluminum or a synthetic resin. The drive shaft 2 passing through the pole pieces 6 and 7 is made of a magnetic material, and a narrow gap 9 is formed between the outer circumferential surface 2A of the shaft 2 and the inner circumferential surfaces 6A and 7A of the pole pieces 6 and 7. A magnetic fluid 10 is filled in the gap 9 and held by a magnetic force to thereby completely seal the inside from the outside of the casing.

The conventional magnetic fluid 10, when it is used as the sealing agent described above, is usually prepared by using a hydrocarbon oil, that is, a less volatile organic solvent such as mineral oil, synthetic oil, ester oil or ether oil as a dispersing medium (carrier) and dispersing fine ferromagnetic particles coated a the surface thereof with a dispersing agent having oleophilic groups that have an affinity with the hydrocarbon oil stably present in the dispersing medium.

Examples of suitable dispersing media include, poly-alpha-olefin oils, alkyl naphthanalene oils, hexadecyldiphenylether, octadecyldiphenyletherandtri-2-ethylhexyl trimellitate. The dispersing agent can be a surface active agent, such as synthetic sulfonic acids, polybutene succinic acid, polybutene sulfonic acid, unsaturated fatty acids, phosphate esters and the salts thereof.

Magnetic fluids comprising hydrocarbon oil as the carrier exhibit good "wetting" characteristics. When used in a sealing device, these materials will wet the outer surface of the drive shaft, such as surface 2A of the drive shaft in FIG. 6. The fluid tends to extend over the wide range of the outer surface 2A of the drive shaft. If the magnetic fluid 10 extends over the wide range of the outer surface 2A of the drive shaft, the amount of the magnetic fluid capable of providing the aimed sealing function is decreased relatively to shorten the working life of the sealing device.

Further, if the magnetic fluid 10 extending along the outer surface 2A of the drive shaft 2 also extends along the lateral side 6B of the pole piece of the inner circumferential surface 4A of the housing 4, the magnetic fluid can be scattered by centrifugal force into the clean space in which the hard disk is disposed. If deposited on the hard disk, the magnetic fluid would cause malfunction in the computer, etc.

Figure 7:
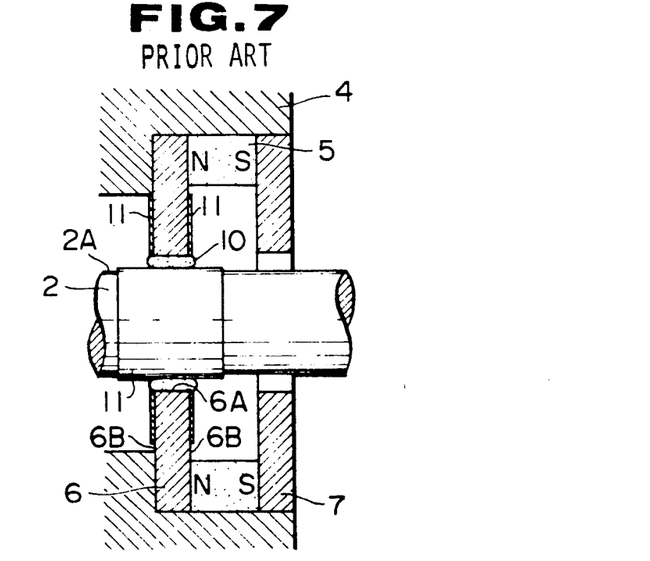

A countermeasure for excessive "wetting" characteristics described above is discussed in Japanese Patent Publication Sho 60-48668 which discloses a structure such as that shown in FIG. 7, and, for purposes of this discussion is referred to as the second Example in which a membrane 11 is attached to the outer surface 2A of the driving shaft 2 and the lateral side 6B of the pole piece, near the gap between shaft 2 and the pole pieces 6 and 7. The material may be made of a fluorocarbon such as polytetrafluoroethylene (PTFE). In this device, it is intended to effectively prevent "wetting" with the magnetic fluid 10 by directly coating the outer surface of 2A of the drive shaft and the lateral side 6B of the pole pieces with the membrane of the fluorocarbon material while taking notice of the oil repellent property thereof.

It has also been known to formulate a magnetic fluid using a non-volatile and oil repellent perfluoropolyether oil as a carrier, in which fine ferromagnetic particles are disposed (see U.S. Pat. No. 3,784,471 and Japanese Laid Open Patent Application Sho 61-263202). The fluorocarbon magnetic fluid disclosed in those references is intended for use in specific conditions such as in corrosive atmospheres or under low temperatures in which the use of a magnetic fluid comprising a simple hydrocarbon oil carrier is difficult. Because the fluorocarbon magnetic fluid exhibits diminished "wetting" characteristics with metal, diffusion to the outer surface of the drive shaft or the lateral sides of the pole pieces may be reduced when used in the sealing device. Accordingly, hard disk contamination due to the "wetting" can also be decreased (Example 3).

However, the above-mentioned second example of prior art involves the following problems:

(1) Since fluorocarbon compounds such as polytetrafluoroethylene (PTFE), etc. are expensive and exhibit poor molding characteristics, the cost for forming the necessary coating membrane is expensive.

(2) Since it is difficult to control the thickness of the coating membrane to ensure proper thinness and uniformity, the size of the gap between the outer surface 2A of the driving shaft and the inner circumferential surfaces 6A and 7A of the pole pieces can be irregular. Because of this the required amount of magnetic fluid cannot be retained. This results in shortening the life span of the sealing mechanism.

(3) If the coating membrane of PTFE experiences peeling, it forms relatively large dust flakes that can float in the clean space enhousing the hard disk. The PTFE dust particles can adhere to the disk surface, etc. resulting in improper operation in the associated computer or other similar apparatus.

(4) If the coating membrane is peeled or the coating surface contains rough or injured portions, the magnetic fluid tends to extend along the recesses of such portions resulting in the contamination of the clean space from the scattering of the magnetic fluid.

In the third prior art example given, if the magnetic fluid containing the perfluoropolyether oil as a carrier is used for sealing the rotational shaft, it causes the following problems:

(1) The perfluoroether oil used as the carrier is itself expensive. Furthermore, the surface active agent used as the dispersing agent for the fine ferromagnetic particles is also expensive since its hydrophobic groups have a perfluoropolyether structure.

(2) When the fluorocarbon magnetic fluid is used for the dust-proof sealing device, for example in computers, hydrocarbon oil mists formed at the outside of the disk housing such as oil mists generated from the shaft bearing 9 for supporting the driving shaft 2 intrude into the fluorocarbon magnetic fluid. The hydrocarbon oil has lower specific gravity as compared with the fluorocarbon oil and is incompatible with it. Accordingly, the hydrocarbon oil mists are not trapped in the sealing portion but easily intrude into the clean space of the casing by phase separation to contaminate the inside of the latter. Such "phase separation" also occurs, for example, in cases where fluorocarbon magnetic fluids are used to establish the vacuum seal of a vacuum device which has a shaft bearing for which a hydrocarbon oil is used as the lubricant. This results in contamination of the inside of the vacuum vessel.

Because of the reasons described above, magnetic fluids using perflouropolyether oil as the carrier are exclusively used in specific circumstances such as liquid seals or corrosive gas seals in which the use of a magnetic fluid containing an ordinary hydrocarbon oil is not preferred. Use of such materials is not suitable to accomplish dust-proof sealing for computers or vacuum sealing and, as such, lacks in general applicability.

It is, accordingly, an object of the present invention to provide a magnetic fluid composition which does not suffer from peeling or injury, exhibits lowered characteristics of wetting to metal, and does not shorten seal life span due to diffusion, scattering or evaporation, as well as being less expensive, convenient to use, and able to prevent contamination of the sealed space due to phase separation which can occur with hydrocarbon lubricants.

Another object of the present invention is to provide a process for producing the magnetic fluid composition as described above.

A further object of the present invention is to provide a sealing device using the magnetic fluid composition as described above.

SUMMARY OF THE INVENTION

The foregoing objects of the present invention can be attained by a magnetic fluid composition comprising a less volatile organic solvent generally having a volatility of between about $1 \times 10 -2$ Torr to about $1 \times 10 -12$ Torr at 25° C. as a dispersing medium, a dispersing agent having oleophilic groups that exhibit an affinity with the organic solvent employed, fine ferromagnetic particles coated at surface thereof with the chosen dispersing agent and dispersed in the chosen organic solvent and a fluorocarbon surface active material in which a functional group or molecular region having an organophobic properties and the portion having an organophilic properties are present together in one molecular structure.

As the fluorocarbon surface active material used in the present invention, nonionic surface active agents, oligomers and resins can be used. Those preferred are fluoroalkyl esters, perfluoroalkyl esters, perfluoroalkyl ethylene oxide adducts, fluoroalkyl ethylene oxide adducts, perfluoroalkylamine oxide adducts, oligomers containing a perfluoroacrylate structure, or oligomers having a urethane structure in the organophilic portion.

The fluorocarbon surface active material is present in the magnetic fluid in an amount preferably from about 0.01 to about 5% by weight.

In accordance with the present invention, the above-mentioned magnetic fluid composition can be prepared by either a first or a second production process in which the first production includes the following steps:

adding an organic solvent having a boiling point of 120° C. or less at atmospheric pressure and a dispersing agent having oleophilic groups which exhibit an affinity with the selected organic solvent to fine ferromagnetic particles thereby obtaining an intermediate medium in which the fine ferromagnetic particles are coated at the surface thereof with the dispersing agent and are uniformly dispersed in the low boiling point organic solvent;

separating fine particles having poor dispersibilty in the intermediate medium and, then, adding a less volatile organic solvent to the intermediate medium thereby forming a mixture;

heating the mixture thereby evaporating and separating the low boiling organic solvent thereby obtaining a magnetic fluid; and adding a fluorocarbon surface active material to the resultant magnetic fluid.

In the above-mentioned process for producing the magnetic fluid composition, the fluorocarbon surface active material optionally may be added at the separation step in which the fine particles of poor dispersibility present in the intermediate medium are separated and the less volatile organic solvent is, then, added to the intermediate medium.

In accordance with the present invention, the magnetic fluid composition can be prepared by a second production process which comprises the steps of:

adding an organic solvent having a low boiling point and a dispersing agent having oleophilic groups which exhibit an affinity with the solvent to fine ferromagnetic particles thereby bonding the dispersing agent to the surface of the fine ferromagnetic particles and, subsequently, removing the low boiling organic solvent thereby obtaining fine ferromagnetic particles coated at the surface thereof with the dispersing agent; and admixing a less volatile organic solvent and a fluorocarbon surface active material to the fine ferromagnetic particles obtained in the previous step.

In the first or the second production process for producing the magnetic fluid composition as described above the fluorocarbon surface active material may be dissolved in a solvent which is soluble to the less volatile organic solvent, the solution thus formed is admixed and, subsequently, the solvent may be separated by evaporization.

According to the present invention, there is also provided a magnetic fluid sealing device which comprises pole pieces in contact with a magnet and a member to be sealed positioned opposed to the pole pieces to define a gap therebetween, and a magnetic fluid composition disposed within the defined gap, the magnetic fluid composition comprising a less volatile organic solvent as a dispersing medium, a dispersing agent having oleophilic groups that exhibit an affinity with the organic solvent, fine ferromagnetic particles coated at surface thereof with the dispersing agent and dispersed in the less volatile organic solvent and a fluorocarbon surface active material in which an organophobic portion and an organophilic portion are present together in the molecular structure.

DESCRIPTION OF THE ACCOMPANYING DRAWINGS

These and other objects, as well as advantageous features of the present invention will become apparent by reading the following descriptions for the preferred embodiments of the present invention with reference to the accompanying drawings:

FIGS. 1(a) and (b) are a schematic view illustrating the conceptional structure of a fluorocarbon surface active material used in the magnetic fluid composition of the present invention;

DETAILED DESCRIPTION OF THE INVENTION

The magnetic fluid composition of the present invention is more economical since the carrier of choice is a less volatile organic solvent comprising a hydrocarbon oil.

Figure 1:
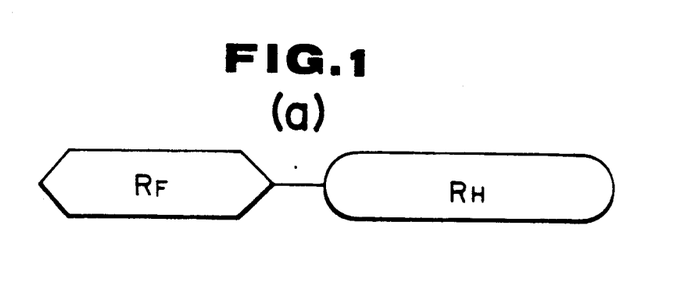

The magnetic fluid composition of the present invention comprises a magnetic fluid which employs the less volatile organic solvent as the carrier of the small amount of the fluorocarbon surface active material added separately to the composition. The fluorocarbon surface active agent has a structure in which a portion ($R_H$) exhibits organophilic properties, (for example, $-CH_2CH_2CH_2-$) and a portion ($R_F$) exhibits organophobic properties, for example, $-CF_2CF_2CF_2-$ present together in one molecular structure as schematically depicted in FIGS. 1(a) and 1(b). FIG. 1(a) schematically shows the conceptional structure of a linear chained molecule, while FIG. 1(b) schematically shows the conceptional structure of an oligomer or a resin.

Figure 2:
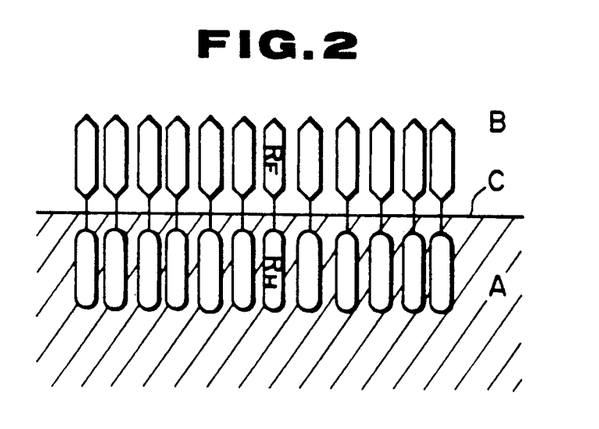
FIG. 2 is a schematic view illustrating the conceptional state in which the surface of the magnetic fluid is coated with the fluorocarbon surface active material.

Accordingly, the fluorocarbon surface active material added here is adsorbed into the gas-liquid interface of the magnetic fluid in a state such as is shown in FIG. 2, gas-liquid interface of the magnetic fluid is coated with the organophobic portion of the active material. In FIG. 2, A represents the magnetic fluid, B represents atmospheric air and C represents the interface.

The magnetic fluid composition of the present invention exhibits reduced wetting characteristics even though the carrier used therein is a hydrocarbon oil. The characteristics exhibited by the material as if there were a fluorocarbon magnetic fluid at the interface in contact with air or the metal surface. Even though the carrier employed therein is a hydrocarbon oil, the magnetic fluid is organophobic and exhibits reduced characteristics of "wetting" to metal. As a result, since the magnetic fluid per se has a function of preventing diffusion, for example, to the metal shaft surface, it is no longer necessary to form an oil repellent coating or to affix an oil repellant membrane to the surface of the shaft or the pole piece thus eliminating the problems encountered heretofore upon formation of the oil repellent coating membrane.

The magnetic fluid of the present invention also exhibits improved physical properties as compared with conventional magnetic fluids using hydrocarbon carriers. For instance, heat resistance of the fluid is improved and evaporation of the carrier can be suppressed to extend the working life of the magnetic fluid.

Because the carrier of the magnetic fluid of the present invention is a hydrocarbon oil, the material has advantages over other fluids. For example, if the magnetic fluid is used to establish a dust-proof seal in a computer or a sealing agent in a vacuum apparatus and hydrocarbon oil mists are evolved from shaft bearings, the oil mists thus generated are rendered compatible with the magnetic fluid carrier of the same kind, are easily trapped therein, and kept from intrusion into the clean space in the casing. Accordingly, the "phase separation" phenomenon described previously does not occur.

Since the interface of the magnetic fluid of the present invention is inherently oil repellent and exhibits less "wetting" with metal, the magnetic fluid of the present invention may be used independently as the sealing agent, eliminating labor and costs which would be incurred for separately forming an oil repellent coating membrane on the surface of the member to be sealed. Thus, it is possible to prevent contamination due to the scattering of the magnetic fluid or the shaft bearing lubricant, to suppress the evaporation of the magnetic fluid, to improve the working life of the sealing and to complete interruption of the oil mists at a reduced cost in a simplified manner.

A detailed description will now be made relating to the magnetic fluid composition, the production process therefor and the magnetic fluid sealing device produced according to the present invention.

The carrier material employed as the dispersing medium for the fine ferromagnetic particles in the present invention, a less volatile organic hydrocarbon solvent can be used. The hydrocarbon is selected from the group consisting of kerosene, mineral oils, synthetic oils, ethers, esters, silicon oils and mixtures thereof. The choice of the exact solvent will vary depending on the application use of the magnetic fluid. For instance, polyalphaolefin oils, alkyl naphthalene oils, hexadecly diphenyl ether, or a mixture of hexadecyl diphenyl ether, octadecyl diphenyl ether and eicosyl naphthalene are preferred for uses such as a sealing agent for magnetic disks.

To obtain the fine ferromagnetic particles employed in the present invention, a magnetite colloid prepared by any well-known wet process can be used. Alternately, particles obtained by the so-called wet grinding process of pulverizing a magnetite powder in water or organic solvent may be used.

In cases where a wet grinding process is utilized and an organic solvent such as hexane is employed in mixture with water as a liquid abrasive, a ferromagnetic powder and a sufficient amount of a dispersing agent may be added and ground in a ball mill for several hours or more. The amount of dispersing agent employed is an amount capable of forming a single molecular layer overlaying the surface of the ferromagnetic particles to be described later.

In addition to the magnetite, ferromagnetic oxides such as manganese ferrite, cobalt ferrite, composite ferrites containing cobalt and manganese together with zinc, nickel, or barium ferrite, as well as ferromagnetic metals such as iron, cobalt and various rare earth metals may be employed.

Furthermore, in addition to the fine ferromagnetic particles obtained by the wet process or wet grinding process as described above, those particles obtained by dry processes can also be used.

The fine ferromagnetic particles may generally be employed in the present invention in an amount between about 1 and about 20% by volume. If necessary, extremely high concentrations up to about 70% can also be used. The concentration of the fine ferromagnetic particles can be controlled to obtain concentrations as high as 70% by utilizing the intermediate medium in which the fine ferromagnetic particles are dispersed in the low boiling solvent which permits the formulation of a magnetic fluid of extremely high magnetization.

The dispersing agent for the fine ferromagnetic particles employed in the present invention preferably exhibits a great affinity with the less volatile organic carrier solvent described previously.

The dispersing agent used herein can be classified as an anionic surface active agent, i.e., a hydrocarbon having a polar group, for example, a carboxyl group, hydroxyl group or a sufonic group such as oleic acid or its salts, petroleum sulfonic acid or its salts, synthetic sulfonic acid or its salt, eicosyl naphthalene sulfonic acid or its salts, polybutene succinic acid or its salts; a non-ionic surface active agent such as polyoxyethylene nonylphenyl ether, and amphoteric surface active agent having both of cationic and anionic portions in the molecular structure such as alkyl diaminoethyl glycine.

As the dispersing agent in the present invention, a so-called coupling agent may also be used. As the coupling agent, there can be mentioned, for example, silane coupling agents represented by the general formula: $YRSiX_n$ ($n=1-3$) or $RSiX_n$ ($n=1-3$), in which Y represents an organic functional group such as a vinyl group, epoxy group, amino group or mercapto group, R represents a hydrocarbon group such as alkyl group, X represents a hydrolyzable group, for example, an alkoxy group ($R'O-$) such as methoxy group ($CH_3O-$) or ethoxy group ($C_2H_5O-$).

The alkoxy group in the silane coupling agent is hydrolyzed in an aqueous solution, by moisture in air or moisture adsorbed on the surface of inorganic material, to form a silanol group ($Si-OH$). On the other hand, without being bound to any theory, it is believed that the fine ferromagnetic particles have $-OH$ groups at the surface thereof ($M-OH$), and a dehydrating condensation reaction occurs between both groups to form chemical bonds by way of a metasiloxane coupling ($Si-O-M$).

The silane coupling agent represented by the general formula: $YRSiX_n$ is, for example, vinyl triethoxy silane and the silane coupling agent represented by the general formula: $RSiX_n$ is, for example, octadecyl trimethoxy silane.

In addition to the silane coupling agent as described above, there are also used other coupling agents, for example, an aluminum series coupling agents comprising acetoalkoxy aluminum diisopropylate, titanate series coupling agents or chromium series coupling agents which are particularly suitable to non-aqueous systems. They also have an alkoxy group bonding with an $-OH$ group and a portion having an affinity for organic material (for example, alkyl acetoacetic group) in the molecular structure and function to chemically bond with $-OH$ groups at the surface of the fine ferromagnetic particles as a hydrophilic solid thereby forming a firm oleophilic coating membrane.

The amount of the coupling agent added is, most suitably, such an amount as is capable of completely coating the surface of the fine ferromagnetic particles with a single molecular layer. This amount is determined by considering the specific surface area of the fine ferromagnetic particles, water content, hydrolizability of silane and differences in membrane-forming conditions.

The fluorocarbon surface active material employed in the present invention is, basically, a nonionic fluorocarbon surface active agent, oligomer or resin which includes a portion of an organophobio fluorocarbon chain ($R_F$) and a portion of an organophilic hydrocarbon chain ($R_H$). The portion for the fluorocarbon chain ($R_F$) is selected from the group consisting of fluorophenylene groups, fluoroether groups, fluoroalkyl groups, perfluoroalkyl groups, perfluoropolyether and mixtures thereof. Most generally, the fluorocarbon chain comprises a perfluoroalkyl group in which the number of carbon atoms is appropriately within a range from 1 to 18. When employing the term "number of carbon atoms", "1" is equivalent to the minimum number necessary for orienting the fluorocarbon on the surface of the magnetic fluid. On the other hand, of the number of carbon atoms exceeds 18, solubility of the magnetic fluid is lowered.

The portion for the hydrocarbon chain ($R_H$) comprises a saturated or unsaturated hydrocarbon chain having 5 to 18 carbon atoms. In particular, a hydrocarbon chain selected from the group consisting of ethylene oxide groups, vinyl groups, amino groups, ester groups, epoxy groups, acrylate groups, ether groups, methyl siloxane groups, dimethyl siloxane groups and mixtures thereof by about 5 to 25 addition mol number is suitably used in the present invention.

As the non-ionic fluorocarbon surface active material described above, there can be mentioned, for example, perfluoroalkyl adducts of ethylene oxide, perfluoroalkyl adducts of amine oxide, perfluoroalkyl oligomers, perfluoroacrylate-containing oligomers, fluoroalkyl esters, perfluoroalkyl groups containing urethane, and oleophilic groups containing urethane.

When the fluorocarbon surface active material is mixed into a magnetic fluid, the portion having the hydrocarbon chain ($R_H$) remains in the carrier due to its orqanophilic property. The portion having the fluorocarbon chain ($R_F$) is driven out of the carrier due to its organophobic property. The ($R_F$) portion is in a predetermined direction and adsorbed while being oriented at the surface (interface) of the magnetic fluid.

The amount of the fluorocarbon surface active material added to the magnetic fluid in the present invention varies depending on the adsorption property (adsorption amount) of the magnetic fluid carrier. The desired purpose can be attained by adding the fluorocarbon surface active material in an amount between about 0.01 and about 5% by weight; preferably, from about 0.05 to about 3% by weight. The amount added can depend on the conditions under which the magnetic fluid is used. For instance, if the amount of fluorocarbon surface active material added exceeds the saturation adsorption amount, prolonged use is possible even under conditions where the fluorocarbon surface active material is consumed at the surface. Without being bound to any theory, it is believed that in such circumstances, the excess portion of the fluorocarbon is dispersed to the inside of the magnetic fluid and can supplement the surface thereof. However, if the addition amount exceeds 5% by weight, the solubility of the magnetic fluid is decreased and no further improvement can be expected by the excess addition.

Upon production of the magnetic fluid composition according to the present invention, if it is intended to obtain a magnetic fluid of high stability by effectively removing particles having poor dispersibility in the fine ferromagnetic particles or to obtain a magnetic fluid having highly magnetizable performance by increasing the concentration of the ferromagnetic particles to be dispersed in the carrier, the production process for the magnetic fluid previously proposed by the present applicant and discussed in Japanese Laid Open Patent Application Sho 58-174495 can be adopted effectively.

That is, fine ferromagnetic particles and a dispersing agent are at first added to an organic solvent having a low boiling point such as hexane or benzene. This provides an intermediate medium in which fine ferromagnetic particles coated at the surface thereof with the dispersing agent are dispersed in the low boiling organic solvent. If fine ferromagnetic particles obtained by the wet process are used in this case, the intermediate medium many also be obtained by adding a required amount of the dispersing agent to an aqueous suspension of the fine ferromagnetic particles to form a coating layer, washing and then drying them to obtain fine hydrophobic ferromagnetic particles and, subsequently, adding a low boiling organic solvent.

Fine particles having poor dispersibility in the intermediate medium can then be removed by centrifugal separation with a centrifugal force between about 5000-8000 G. Since the viscosity of the intermediate medium comprising the low boiling organic solvent is extremely low, the centrifugal separation can be conducted effectively.

Subsequently, a less volatile organic solvent suitable for use as the carrier is admixed and the mixture is heated either at atmospheric pressure or a reduced pressure to remove the low boiling organic solvent by evaporation. Alternately, the intermediate medium can be heated to evaporate the low boiling organic solvent. Subsequently a carrier is added to the fine ferromagnetic particles and, if necessary, the low boiling organic solvent is further evaporated. In this way, an extremely stable magnetic fluid solution can be prepared.

In this case, it is also possible, if necessary, to obtain a magnetic fluid in which an extremely high concentration of fine ferromagnetic particles are contained and stably dispersed by repeating the procedure of further adding the intermediate medium to the resultant magnetic fluid composition and heating it.

Any of the above mentioned steps may be selected and used depending, for example, on the kind, application use and required performance of the resulting products.

In the production process for the magnetic fluid composition according to the present invention, the fluorocarbon surface active material may be optionally added after the step of obtaining the intermediate medium during the production steps for the magnetic fluid, or it may be added to the magnetic fluid as finally obtained. Further, the fluorocarbon surface active material may be added directly, or it may be previously dissolved in a solvent and the resulting solution then mixed with the magnetic fluid. Subsequently, the solvent may be removed by evaporation. Suitable solvents for this procedure include mineral oils such as kerosene, benzene, toluene, xylene, alcohol, cellosolve, ethylacetate, cellosolve acetate, MEK (methyl ethyl ketone), MIBK (methyl isobutyl ketone), 1,1,1-trichloroethane, chloroform, carbon tetrachloride, DMF (dimethyl formaldehyde) and ethylacetate.

Where the fluorocarbon surface active material is added in the step of preparing the intermediate medium, the fluorocarbon may be added after being dissolved in the solvent used in the preparation of the intermediate medium such as hexane.

Alternately, the fluorocarbon surface active material may also be added in admixture with the carrier used for the magnetic fluid previously described above, that is, an organic solvent such as various hydrocarbons, synthetic oils, ethers or esters, in addition to the solvent described above.

EXAMPLE I

This example outlines preparation of magnetic fluid in which the fluorocarbon surface active material is added at the final step.

A magnetite colloid was prepared by a wet process in which an aqueous 6N NaOH solution was initially added to one liter of an aqueous solution containing 0.3 mol ferrous sulfate and 0.3 mol ferric sulfate until the pH value was increased to greater than 11. The resulting liquid mixture was aged at 60° C. for 30 min to obtain an aqueous suspension of magnetite colloid. The aged liquid was washed with water at a room temperature to remove electrolytes present in the slurry.

An aqueous 3N HCl solution was added to the magnetite colloidal liquid thus prepared to adjust the pH valve to 3. Thirty grams of synthetic sodium sulfonate was then added as a surface active agent and stirred at 60° C. for 30 min to permit the adsorption of the surface active agent on the surface of the fine magnetite particles. The material was then allowed to sit undisturbed to permit the fine magnetite particles in the liquid to coagulate and settle. The supernatant liquid was discarded. The material was then stirred with the addition of fresh water. After stirring, it was permitted to sit undisturbed and settle. The supernatant liquid was, then, discarded. After repeating the water washing procedure several times and removing the electrolytes in the aqueous solution, filtration, dehydration and drying were applied to obtain powdery fine magnetite particles coated at the surface thereof with the surface active agent.

Then, when the chosen low boiling solvent, hexane, was added to the magnetite powder and shaken sufficiently, an intermediate medium comprising magnetite particles dispersed in hexane was obtained.

The intermediate medium was separated by a centrifugation for 30 min under a centrifugal force of 8000 G to precipitate and remove relatively large particles of poor dispersibility from the dispersed magnetite particles. The supernatant liquid containing fine magnetite particles still dispersed therein was transferred to a rotary evaporator and the low boiling point organic solvent was removed by evaporation while maintaining a temperature of 90° C. to obtain oleophilic fine magnetite particles.

After sampling 5 g of the fine magnetite particles and dispersing them again once again in hexane, 4 g of octadecyl diphenyl ether was admixed as a carrier. The liquid mixture was transferred to a rotary vacuum evaporator and the low boiling organic solvent was removed by evaporation while maintaining the temperature at 90° C. As a result, the fine magnetite particles were dispersed in the carrier. They were subjected to further centrifugation and treated under a centrifugal force of 8000 G for 30 min. Non-dispersed solid material removed by this operation and highly stable magnetic fluid was obtained.

Three milligrams of a perfluoroalkyl adduct of ethylene oxide (UNIDYNE DS-401, manufactured by Daikin Industries, Ltd.) was dissolved in benzene and was added as a fluorocarbon surface active material to 3.0 g of the magnetic fluid suspended in octadecyl diphenyl ether and mixed uniformly. The liquid mixture was transferred to a rotary vacuum evaporator and the low boiling point organic solvent was removed by evaporation while maintaining the temperature at 90° C. In this way, a magnetic fluid composition containing the fluorocarbon surface active material was obtained.

EXAMPLE II

This example outlines preparation of magnetic fluid in which the fluorocarbon surface active material is added into the intermediate medium together with the carrier in the procedure.

Oleophilic fine magnetite particles were obtained by way of the same steps as outlined in Example 1. After sampling 5 g of the fine magnetite particles and dispersing them in hexane to prepare an intermediate medium, 4 g of octadecyl diphenyl ether was added as the carrier. At the same time, 10 mg of a fluoroalkyl adduct of ethylene oxide (UNIDYNE DS-406, manufactured by Daikin Industries, Ltd.) was also added as the fluorocarbon surface active material. The material was thoroughly mixed, the liquid mixture was transferred to a rotary vacuum evaporator and the low boiling organic solvent was removed by evaporation while maintaining the temperature at 90° C. As a result, fine magnetite particles were dispersed in the carrier. They were further subjected to a centrifugation for 30 min under a centrifugal force of 8000 G. Non-dispersed solid material was removed by this procedure to obtain a magnetic fluid composition containing the fluorocarbon surface active material.

EXAMPLE III

This example presents a comparison of the solubility for various fluorocarbon surface-active materials in magnetic fluids of different compositions.

A plurality of kinds of magnetic fluids comprising different combinations for the carrier and the dispersing agent were prepared. The combinations are as shown in Table I.

TABLE I

| No. | Carrier | Dispersing agent |
|---|---|---|
| 1 | Eicosyl naphthalene | Eicosyl naphthalene sulfinic acid. |
| 2 | Mixture of octadecyl diphenyl ether and hexadecyl diphenyl ether | Synthetic sulfonic acid |
| 3 | Mixture of octadecyl diphenyl ether and hexadecyl diphenyl ether | Polybutene succinic acid |
| 4 | Poly-alpha-olefin oil | Mixture of elaidic acid and erucic acid |
| 5 | Poly-alpha-olefin oil | Synthetic sulfonic acid |
| 6 | Tri-2-ethylhexyl trimellitate | Oleic acid and polyoxyethylene nonylphenyl ether |

The following fluoric surface active materials were selected:

A. GALDEN MONO ACID; a perfloropolyether carboxylic acid commercially available from Nippon Montedison K.K.

B. FTERGENT 300; a perfloroalkyl guaternary ammonium salt commercially available from Neos Company Limited.

C. UNIDYNE DS-101; a perfloroalkyl carboxylic acid commercially available from Daikin Industries, Ltd.

D FTERGENT 400S; a perfloroalkyl betaine commercially available from Neos Company Limited.

E. FTERGENT 251; a perfloroalkyl ethylene oxide adduct commercially available from Neos Company Limited.

F. UNIDYNE DS-401; a perfloroalky ethylene oxide adduct commercially available from Daikin Industries, Ltd.

G. UNIDYNE DS-451; a perfloroalkyloligomer commercially available from Daikin Industries, Ltd.

H. UNIDYNE DS-406; a floroalkyl ethylene oxide adduct commercially available from Daikin Industries, Ltd.

I. MEGAFAC F-142D; a perfloroalkyl ethylene oxide adduct commercially available from Dainippon Ink and Chemicals, Inc.

J. Fluorad FC-430; a floroalkyl ester commercially available from Sumitomo 3M Co., Ltd.

K. SURFLON S-141; a perfloroalkyl amine oxide adduct commercially available from Asahi Glass Co., Ltd L. SURFLON S-382; a perfloroacrylate-containing oligomer commercially available from Asahi Glass Co., Ltd.

M. MEGAFAC F-183; a urethane material containing perfloroalkyl groups and oleophilic groups commercially available from Dainippon Ink and Chemicals, Inc.

In the fluorocarbon surface active material described above, A, B, C and D are ionic or amphoteric surface active agents and E-M are non-ionic surface active agents.

Table 2 shows the limits of solubility in a case when each of the fluorocarbon surface active materials A-M is added to each of the magnetic fluids of the compositions listed as #1-#6 in Table I above.

The solubility results are listed in Table II. In that table, each of symbols represent the following content:
X: not dissolved
Δ: dissolved by 0.01 to 0.1% by weight
○: dissolved by 0.1 to 1% by weight
⊙: dissolved by more than 1% by weight

TABLE II

|   | #1 | #2 | #3 | #4 | #5 | #6 |
|---|---|---|---|---|---|---|
| A | X | X | X | X | X | X |
| B | X | X | X | X | X | X |
| C | X | X | X | X | X | X |
| D | X | X | X | X | X | X |
| E | ○ | ○ | ○ | ○ | ○ | ○ |
| F | ⊙ | ⊙ | ⊙ | ⊙ | ⊙ | ⊙ |
| G | △ | △ | △ | △ | △ | X |
| H | ⊙ | ⊙ | ⊙ | ⊙ | ⊙ | ⊙ |
| I | ⊙ | ⊙ | ○ | ○ | ○ | △ |
| J | ⊙ | ⊙ | ⊙ | ⊙ | ⊙ | ⊙ |
| K | △ | △ | △ | △ | △ | △ |
| L | △ | △ | △ | △ | △ | △ |
| M | △ | △ | △ | △ | △ | X |

From the results shown in Table 2, it can be seen that the fluorocarbon surface active agents A–D which have properties other than non-ionic are not dissolved in the magnetic fluid and, accordingly, are not suitable for use in the present invention.

It has been observed that most of non-ionic fluorocarbon surface active agents E–M are soluble to the magnetic fluid and, among them, perfluoroalkyl ethylene oxide adducts and fluoroalkyl ethylene oxide adducts have particularly preferred solubility.

EXAMPLE IV

This example outlines the relationship between the concentration of the fluorocarbon surface active material in the magnetic composition and the contact angle with a metal surface.

Four kinds of magnetic fluid compositions comprising magnetic fluid #5 outlined in Example III (using poly-alpha-olefin oil as a carrier and synthetic sulfonic acid as a dispersing agent for fine ferromagnetic particles), and each one of E (FTERGENT 251), F (UNIDYNE DS-401), J (Fluorad FC-430) and L (SURFLON S-382) among the non-ionic fluoric surface active materials added thereto were prepared and the contact angle $\theta$ to a stainless steel material (SUS 430) was measured and compared for the specimens at various additive concentrations.

Figure 3:
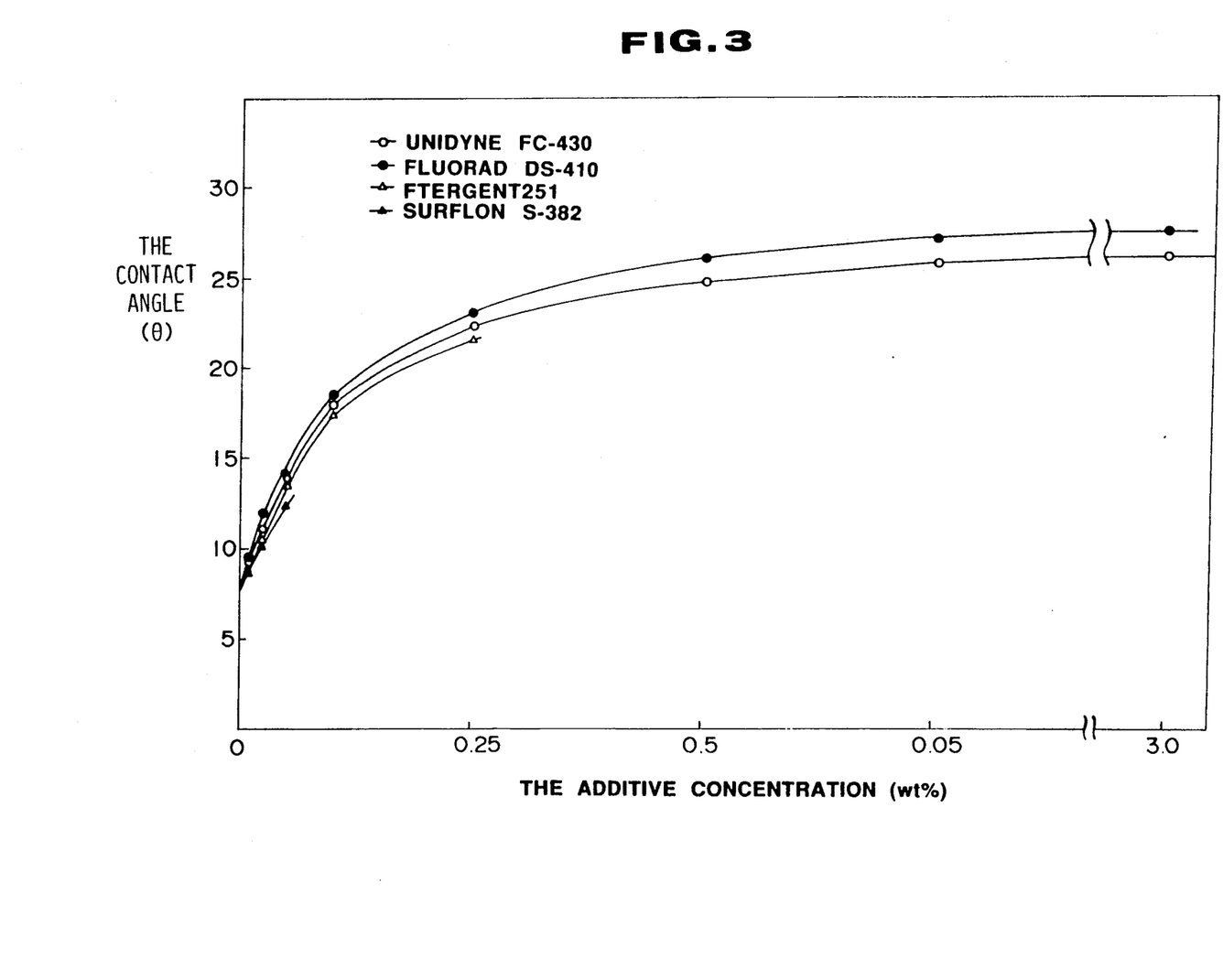
FIG. 3 is a graphic view representing a relationship between the concentration of the fluorocarbon surface active material and the angle of the contact to the metal surface in the magnetic fluid composition of the present invention.

The results are shown in FIG. 3. As can be seen from the Figure, the contact angle $\theta$ increases along with increases in the additive concentration. This means that "wetting" to the stainless steel material becomes more difficult. It can also be seen that the contact angle $\theta$ reaches its upper limit at the additive concentration of 4% by weight.

EXAMPLE V

The effect of fluorocarbon surface active material on "wetting" to a shaft surface upon using the magnetic fluid composition of the present invention for sealing devices was measured and is detailed in this example.

Figure 4:
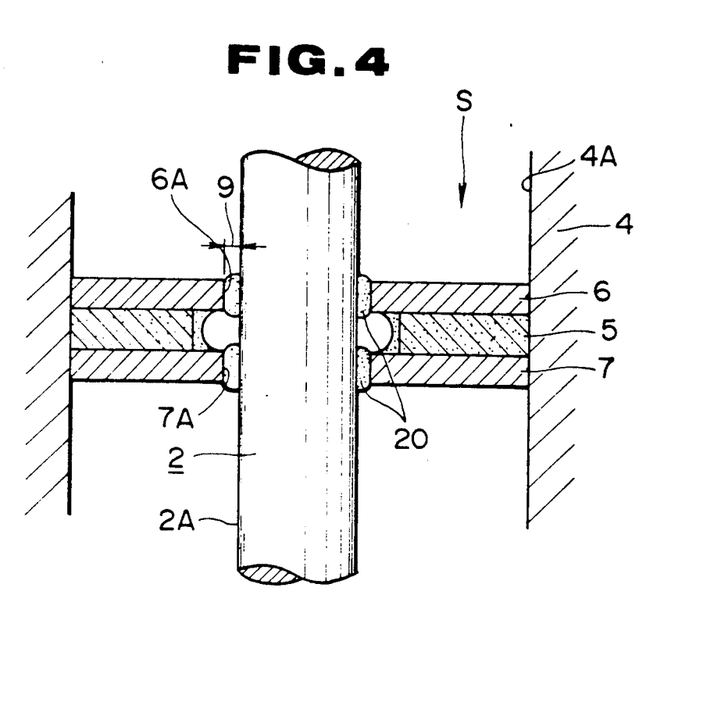
FIGS. 4 and 5 are, respectively, cross sectional views each for a portion of magnetic fluid sealing device according to the present invention.
Figure 5:
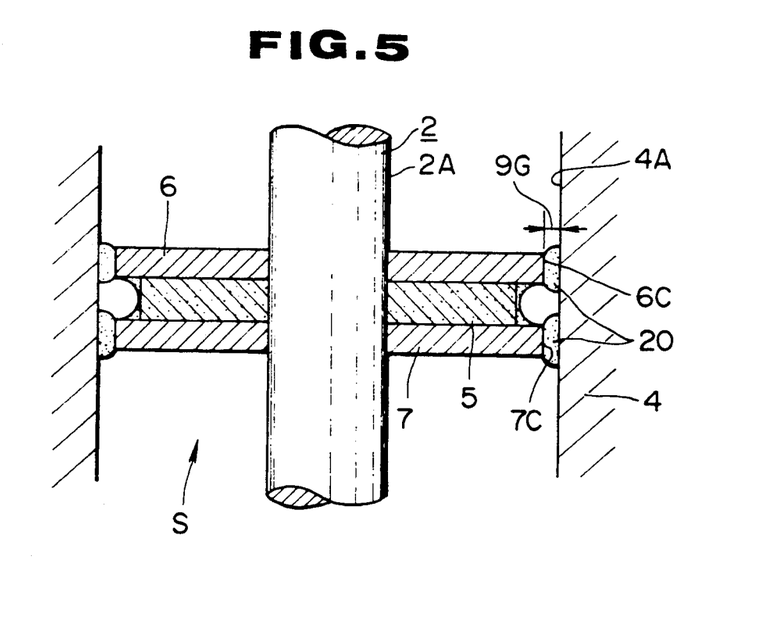

FIGS. 4 and 5 show examples of the magnetic fluid sealing device according to the present invention. In any of the devices, a shaft 2 (made of SUS 430 stainless steel) rotatable relative to housing 4 having a cylindrical inner circumferential surface 4A was disposed to the axial center of the housing 4, and at least one (two in the drawing) annular pole pieces 6, 7 having an annular permanent magnet 5 magnetized in the axial direction and sandwiched therebetween were disposed in a cylindrical space S between the outer circumferential surface 2A of the shaft 2 and the inner circumferential surface 4A of the housing 4 such that the space S was partitioned into upper and lower portions.

In the device shown in FIG. 4, the pole pieces 6, 7 were secured at their outer diametrical periphery to the inner circumferential surface 4A of the housing 4 and had a narrow gap 9 between the inner diametrical periphery 6A, 7A of the pole pieces 6, 7 and the outer circumferential surface 2A of the shaft 2.

In the device shown in FIG. 5, the pole pieces 6, 7 were secured at their inner diametrical periphery to the outer circumferential surface 2A of the shaft 2 and had a narrow gap 9G between the outer diametrical periphery 6C, 7C of the pole pieces 6, 7 and the inner circumferential surface 4A of the housing 4.

In each of the devices, a magnetic fluid 20 prepared according to the process of the present invention was introduced into the gap 9 or 9G as a sealing agent. The magnetic fluid 20 was held by magnetic flux formed between the circumferential end faces of the pole pieces 6, 7 and the outer circumferential surface 2A of the shaft 2 as the opposed member to be sealed (between the end faces of the pole pieces and the inner circumferential surface 4aof the housing 4 as the member to be sealed in the device shown in FIG. 5).

In this Example, the magnetic fluid sealing device shown in FIG. 4 was used. The inner diameter of the housing 4 was 19 mm, the outer diameter of the shaft 2 was 7 mm and the gap between the outer circumferential surface 2A of the shaft 2 and the inner diametrical surface 6A, 7A of the pole pieces 6, 7 was 0.2 mm. The amount of the magnetic fluid 20 held in the gap 9 was 15 microliters.

The shaft 2 was rotated at a rotational speed of 3600 rpm in a standard atmosphere at a temperature of 60° C. The displacement of the magnetic fluid 20 from the sealing surface to the upper portion of the shaft 2 was measured after the lapse of 100 hours.

Poly-alpha-olefin oil was used as the carrier and synthetic sulfonic acid was used as the dispersing agent for the fine ferromagnetic particles (as outlined in Sample 5 in Example III) and "YBUDTBE DS-401" (manufactured by Daikin Industries, Ltd.) was added as the fluorocarbon surface active agent in the magnetic fluid employed. Table 3 outlines the results of the measurement of displacement of five kinds of specimens with each of the additive concentrations being adjusted, on a weight basis, to 0.01, 0.025, 0.05, 0.1, and 0% (no addition, i.e., corresponding to conventional magnetic fluid). The results are summarized in Table III.

TABLE III

| Concentration (wt %) | 0 | 0.01 | 0.025 | 0.05 | 0.01 |
|---|---|---|---|---|---|
| Displacement (mm) | 1.5–1.8 | 0.6–1.0 | 0–0.2 | 0 | 0 |

As seen from the results outlined in Table III, as "wetting" caused by the magnetic fluid 20 to the shaft 2 as the sealed member is lowered, the displacement of the fluid is smaller.

The displacement of the conventional magnetic fluid to which no additional fluorocarbon surface active agent has been added was found to be high. Results such as these indicate that the given material is not suitable as the sealing agent for the computer hard disk devices or vacuum apparatus. Satisfactory results evidenced in displacement reduction by about one-half can be obtained by merely adding fluorocarbon surface active material by an extremely small amount, for example, 0.01% by weight. It has been found that if the additive concentration is further increased slightly, the displacement is reduced to 0 and thus the diffusion of the sealing agent can be prevented completely.

In addition, an oil repellent coating membrane such as the ones attached to the outer circumferential surface 2A of the shaft 2 and the surface of the pole pieces 6, 7 is not necessary. Instead it is only necessary to fill the sealing gap 9 with the magnetic fluid 20, making it very convenient to use.

Further, the magnetic fluid composition of the present invention eliminates the worry of peeling after prolonged operation as in the case when an oil repellent coating membrane is used. Oil mists derived from bearing lubricants made of hydrocarbon are not passed through the sealing agent by the phase separation.

As has been explained above, in the magnetic fluid composition according to the present invention, when a fluorocarbon surface active material in which an organophobic portion and an organophilic portion are present together in the molecular structure is added in small amounts to a magnetic fluid using a less volatile organic solvent as a carrier and, accordingly, the following advantageous effects can be obtained.

The surface of the magnetic fluid is covered completely with the organophobic portion of the fluorocarbon surface active material. The fluid behaves as if it were an organophobic magnetic fluid though the carrier is a less volatile organic hydrocarbon solvent. The "wetting" to metal is extremely low. Accordingly, the sealing material is quite free from the worry of contaminating the seal space by scattering.

Since the required concentration of the expensive fluorocarbon surface active material is small, material cost is reduced. Because the magnetic fluid does not suffer from accelerated evaporation or scattering due to its thin and widespread diffusion, sealing life is increased. Additional oil repellent coating membranes attached to a member are not necessary to form an effective seal. Instead it is only necessary to fill the sealing gap with the fluid, making the material of the present invention convenient to use. Because the carrier is the less volatile hydrocarbon solvent, it causes no phase separation with the hydrocarbon lubricant and can completely interrupt the oil mists.

In addition, in the production process according to the present invention, since the step of adding the fluorocarbon surface active material is combined with the conventional production step in which the less volatile organic solvent is mixed with the fine ferromagnetic particles coated at the surface thereof with the dispersing agent either directly or by way of the intermediate medium containing the fine ferromagnetic particles dispersed in the low boiling organic solvent, no extra cost for the production and installation are necessary and the fluid can be produced at a reduced cost by existing facilities.

Because the fluorocarbon surface active material is added at selected times, for example, either during or after the production step, high production efficiency can be obtained.

Furthermore, since the magnetic fluid sealing device according to the present invention has such a structure in which a magnetic fluid composition according to the present invention incorporated with the fluoric surface active material is disposed in the gap between the pole pieces and the sealed member opposed thereto, it can provide the advantage of not contaminating the seal space, reducing the cost, improving the sealing live, convenience of use and the capability of completely interrupting the oil mists.

What is claimed is:

1. A magnetic ferrofluid composition consisting essentially of:
    an organic solvent as a dispersing medium, said organic solvent having a volatility between about $1 \times 10_{-2}$ Torr and about $1 \times 10^{-12}$ Torr at 25° C.;
    fine ferromagnetic particles coated at the surface thereof with a dispersing agent and dispersed in said organic solvent, said dispersing agent having oleophilic groups exhibiting an affinity with said organic solvent; and
    a fluorocarbon surface active material admixed in said organic solvent independent of said ferromagnetic particles, said fluorocarbon surface active material having a first and a second portion present in a single molecular structure, said first portion having a fluorinated moiety and exhibiting organophobic properties and said second portion having organophilic properties wherein said fluorocarbon surface active material locates itself at an interface between said organic solvent and surrounding media such that said first portion of said fluorocarbon surface active material is oriented away from said organic liquid and said second portion is oriented toward said organic liquid.

2. The magnetic fluid composition as defined in claim 1, wherein the fluorocarbon surface active material is a nonionic surface active agent.

3. The magnetic fluid composition as defined in claim 1, wherein the fluorocarbon surface active material is a fluoroalkyl ester.

4. The magnetic fluid composition as defined in claim 1, wherein the fluorocarbon surface active material is a perfluoroalkyl ester.

5. The magnetic fluid composition as defined in claim 1 wherein the fluorocarbon surface active material consists essentially of perfluoroalkyl adducts of ethylene oxide.

6. The magnetic fluid composition as defined in claim 1, wherein the fluorocarbon surface active material consists essentially of fluoroalkyl adducts of ethylene oxide.

7. The magnetic fluid composition as defined in claim 1, wherein the fluorocarbon surface active material consists essentially of perfluoroalkyl adducts of amine oxide.

8. The magnetic fluid composition as defined in claim 1, wherein the fluorocarbon surface active material is an oligomer containing a perfluoroacrylate structure.

9. The magnetic fluid composition as defined in claim 1, wherein the fluorocarbon surface active material is an oligomer having a urethane structure containing the perfluoroalkyl group and an oleophilic group.

10. The magnetic fluid composition as defined in claim 1, wherein the content of the fluorocarbon surface active material in the magnetic fluid is between about 0.01 and about 5% by weight.

* * * * *